(12) United States Patent
Chaug et al.

(10) Patent No.: US 7,301,693 B2
(45) Date of Patent: Nov. 27, 2007

(54) DIRECT DRIVE DISPLAY WITH A MULTI-LAYER BACKPLANE AND PROCESS FOR ITS MANUFACTURE

(75) Inventors: Yi-Shung Chaug, Cupertino, CA (US); Jack Hou, Fremont, CA (US); Mike Sereda, Burlingame, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

(21) Appl. No.: 11/195,167

(22) Filed: Aug. 1, 2005

(65) Prior Publication Data

US 2006/0033981 A1    Feb. 16, 2006

Related U.S. Application Data

(60) Provisional application No. 60/601,700, filed on Aug. 13, 2004.

(51) Int. Cl.
*G02B 26/00* (2006.01)
*H01J 9/24* (2006.01)
*G09G 3/34* (2006.01)

(52) U.S. Cl. .................... 359/296; 445/24; 345/107

(58) Field of Classification Search ............. 359/296, 359/290; 345/107; 355/50; 445/24
See application file for complete search history.

(56) References Cited

U.S. PATENT DOCUMENTS

| 5,754,332 | A | 5/1998 | Crowley |
|---|---|---|---|
| 5,930,026 | A | 7/1999 | Jacobson et al. |
| 5,961,804 | A | 10/1999 | Jacobson et al. |
| 6,232,950 | B1 | 5/2001 | Albert et al. |
| 6,497,942 | B2 | 12/2002 | Sheridon et al. |
| 6,588,131 | B2 | 7/2003 | O'Connell, Jr. |
| 6,672,921 | B1 | 1/2004 | Liang et al. |
| 6,795,138 | B2 | 9/2004 | Liang et al. |
| 6,856,131 | B2 | 2/2005 | Miyazawa et al. |
| 6,930,818 | B1 | 8/2005 | Liang et al. |
| 6,933,098 | B2 | 8/2005 | Chan-Park et al. |
| 6,982,178 | B2 | 1/2006 | LeCain et al. |
| 2003/0203101 | A1 | 10/2003 | Chaug et al. |
| 2004/0131779 | A1 | 7/2004 | Haubrich et al. |
| 2004/0175924 | A1* | 9/2004 | Choi et al. ................. 438/622 |
| 2004/0182711 | A1 | 9/2004 | Liang et al. |

FOREIGN PATENT DOCUMENTS

| JP | 05-196921 | 8/1993 |
|---|---|---|
| WO | WO 01/67170 | 9/2001 |

(Continued)

OTHER PUBLICATIONS

Allen, K. (Oct. 2003). Electrophoretics Fulfilled. *Emerging Displays Review: Emerging Display Technologies*, Monthly Report—Oct. 9-14, 2003.

(Continued)

*Primary Examiner*—Scott J. Sugarman
*Assistant Examiner*—DaWayne A Pinkney
(74) *Attorney, Agent, or Firm*—Howrey LLP

(57) ABSTRACT

The present invention relates to a direct drive display having a multi-layer backplane and a process for manufacturing such a display.

38 Claims, 10 Drawing Sheets

FOREIGN PATENT DOCUMENTS

| WO | WO 02/01281 | 1/2002 |
|---|---|---|
| WO | WO 02/056097 | 7/2002 |
| WO | WO 02/065215 | 8/2002 |
| WO | WO 03/091788 | 11/2003 |
| WO | WO 2004/068234 | 8/2004 |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI.* 1-10. (In Chinese, English abstract attached, full translation availabe upon request).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Feb. 1, 2005) *Microcupt® Electronic Paper Device and Applicaiton*. Presentation conducted at USDC 4th Annual Flexible Display Conference 2005.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hopper, M. A. et al, "An Electrophoretic Display, its Properties, Model and Addressing", IEEE Transactions on Electron Devices, 26(8): 1148-1152 (1979).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Mossman, et al. (2001), New Reflective Color Display Technique Based on Total Internal Reflection and Subtractive Color Filtering, *SID 2001 Digest*, pp. 1054-1057.

Mossman, et al. (2000), New Reflective Display Based on Total Internal Reflection in Prismatic Microstructure, *SID IDRC Proceedings 2000*, pp. 311-314.

Mossman, et al. (2002), Grey Scale Control of TIR Using Electrophoresis of Sub-Optical Pigment Particles, *SID 2002 Digest*, pp. 522-525.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at 2nd Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging*, SPIE vol. 5289, 102-108.

Zang, H.M., & Liang, R.C. (2003) Microcup Electronic Paper by Roll-to-Roll Manufacturing Processes. *The Spectrum*, 16(2), 16-21.

International Search Report, PCT/US05/29116, mailed Sep. 19, 2007.

\* cited by examiner ("A")

("B")

("L")

("E")

("E")

DIRECT DRIVE DISPLAY WITH A MULTI-LAYER BACKPLANE AND PROCESS FOR ITS MANUFACTURE

RELATED APPLICATION

This application claims the priorities under 35 USC 119(e) of U.S. Provisional Application No. 60/601,700, filed on Aug. 13, 2004. The whole content of the priority application is incorporated herein by reference in its entirety.

FIELD OF THE INVENTION

The present invention relates to a direct drive display having a multi-layer backplane and a process for manufacturing such a display.

BACKGROUND OF THE INVENTION

The electrophoretic display (EPD) is a non-emissive device based on the electrophoresis phenomenon influencing the migration of charged pigment particles in a solvent, preferably a colored dielectric solvent. This type of display was first proposed in 1969. An EPD typically comprises a pair of opposed, spaced-apart plate-like electrodes, with spacers predetermining a certain distance between them. At least one of the electrodes, typically on the viewing side, is transparent. For the passive type of EPDs, row and column electrodes on the top (the viewing side) and bottom plates, respectively, are needed to drive the displays. In contrast, an array of thin film transistors (TFTs) on the bottom plate and a common, non-patterned transparent conductor plate on the top viewing substrate may be used for the active type EPDs.

An electrophoretic dispersion composed of a dielectric solvent and charged pigment particles dispersed therein is enclosed between the two plates. When a voltage difference is imposed between the two electrodes, the charged pigment particles migrate by attraction to the plate of polarity opposite that of the pigment particles. Thus, the color showing at the transparent plate, determined by selectively charging the plates, may be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time.

EPDs of different pixel or cell structures have been reported previously, for example, the partition-type EPD [M. A. Hopper and V. Novotny, IEEE Trans. Electr. Dev., Vol. ED 26, No. 8, pp. 1148-1152 (1979)], the microencapsulated EPD (U.S. Pat. Nos. 5,961,804 and 5,930,026 and U.S. applications Ser. No. 60/443,893, filed Jan. 30, 2003 and Ser. No. 10/766,757, filed on Jan. 27, 2004) and the total internal reflection (TIR) type of EPD using microprisms or microgrooves as disclosed in M. A. Mossman, et al, SID 01 Digest pp. 1054 (2001); SID IDRC proceedings, pp. 311 (2001); and SID'02 Digest, pp. 522 (2002).

An improved EPD technology was disclosed in co-pending applications, U.S. Ser. No. 09/518,488, filed on Mar. 3, 2000 (WO01/67170), U.S. Ser. No. 09/606,654, filed on Jun. 28, 2000 (WO02/01281) and U.S. Ser. No. 09/784,972, filed on Feb. 15, 2001 (WO02/02/65215), the contents of all of which are incorporated herein by reference in their entirety. The improved EPD comprises isolated cells formed from microcups and filled with charged pigment particles dispersed in a dielectric solvent or solvent mixture. To confine and isolate the electrophoretic dispersion in the cells, the filled cells are top-sealed with a polymeric sealing layer, preferably formed from a composition comprising a material selected from a group consisting of thermoplastics, thermoplastic elastomers, thermosets and precursors thereof.

A liquid crystal display comprising display cells prepared by the microcup technology and filled with a liquid crystal composition optionally comprising a dichroic dye is disclosed in a copending U.S. application, Ser. No. 09/759,212, filed on Jan. 11, 2001, the content of which is incorporated herein by reference in its entirety.

For a direct drive display, a display cell layer (10) typically is sandwiched between a common electrode layer (11) and a backplane (12) as shown in FIG. 1a.

The common electrode layer (11) is a single electrode layer which covers the entire display area. The backplane (12) comprises a substrate layer on which a desired graphic pattern (13) is printed or coated with a conductive material. The charged pigment particles in the display cell layer in the area of the desired graphic pattern may migrate to either the side of the common electrode layer or the side of the backplane, depending on the voltage difference between the common electrode layer and the conductive pattern. The color of the non-patterned area (i.e., the background color) is usually achieved by color matching.

The desired graphic pattern may be alphabet letters, numerical displays (such as those utilizing the well-known 7 or 14 segment electrodes), logos or any other graphic designs. Each of the graphic patterns on the substrate layer has a lead line connecting the pattern to associated components such as driver and/or control elements. FIG. 1b shows an example of a graphic pattern (14) with a lead line (14a). For a 7 segment electrode display, each of the seven segment electrodes has a lead line. The lead line (14a) may be formed on the same side of the pattern (14) on the substrate layer or on the opposite side when a via (through hole) is present.

In order to hide them for esthetic reasons, the lead lines are often routed from the patterns to the driver and/or control elements through vias (through holes). However, construction of vias involves costly and complex manufacturing steps. In addition, routing conductive lead lines along the plane of a display between conductive materials and associated components in a single layer often has the risk that undesired electric fields may be established, or desired electric fields may be interfered, by virtue of potentials applied to such lead lines (i.e., the lead lines may act as electrodes, potentially affecting the migration of the charged pigment particles in one or more electrophoretic cells positioned near the lead lines).

SUMMARY OF THE PRESENT INVENTION

The present invention is directed to a direct drive display having a multi-layer backplane and a process for its manufacture.

The first aspect of the present invention is directed to a process for the formation of a multi-layer backplane. The process comprises at least three steps: (1) forming a first conductive layer only in a patterned area on a substrate layer, (2) printing or coating a non-conductive layer over the substrate layer on the side having the desired pattern, except in a non-edge patterned area, and (3) printing or coating a second conductive layer over the substrate layer on the side of the non-conductive layer, except in an edge patterned area. Details of the process are explained below.

The second aspect of the invention is directed to a direct drive display having a multi-layer backplane.

The third aspect of the invention is directed to a process for the manufacture of a direct drive display of the present invention.

The direct drive display manufactured from the present process has a multi-layer backplane which effectively hides the lead lines. In addition, other disadvantages associated with the use of vias are eliminated and no color matching for the background of the display is required. More importantly, the present invention allows roll-to-roll manufacturing of direct drive displays at low costs.

It is noted that the whole content of each document referred to in this application is incorporated by reference into this application in its entirety.

DETAILED DESCRIPTION OF THE PRESENT INVENTION

Figure 1A:
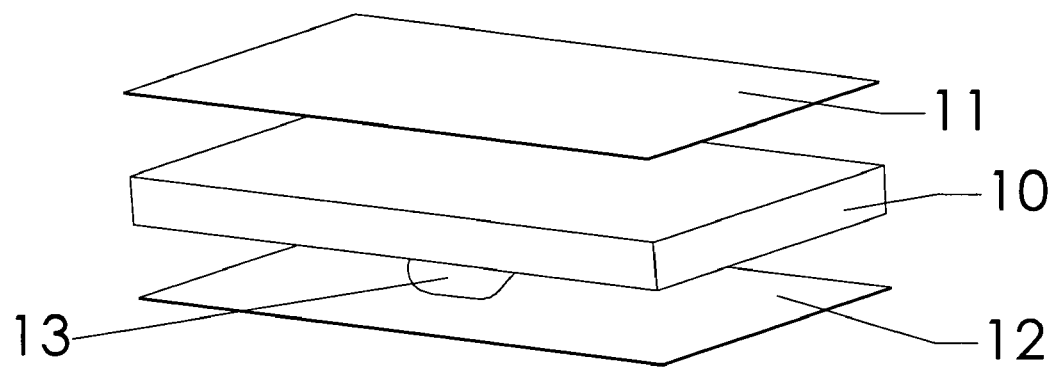
FIG. 1a illustrates general features of a direct drive display.
Figure 1B:
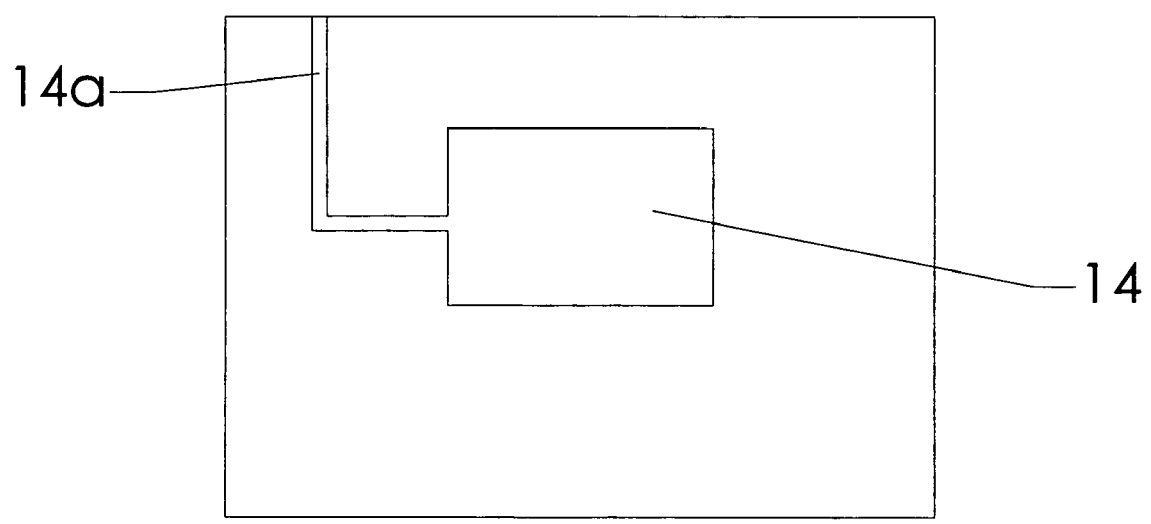
FIG. 1b shows an example of a conductive pattern and the lead line on a substrate layer.

One aspect of the present invention is the formation of the backplane (12) in FIG. 1a. For ease of illustration, only one conductive pattern and its lead line are presented in most of the drawings for discussion. However, it is understood that the process of the present invention may be carried out to form a backplane having one or more patterns and lead lines.

Figure 1C:
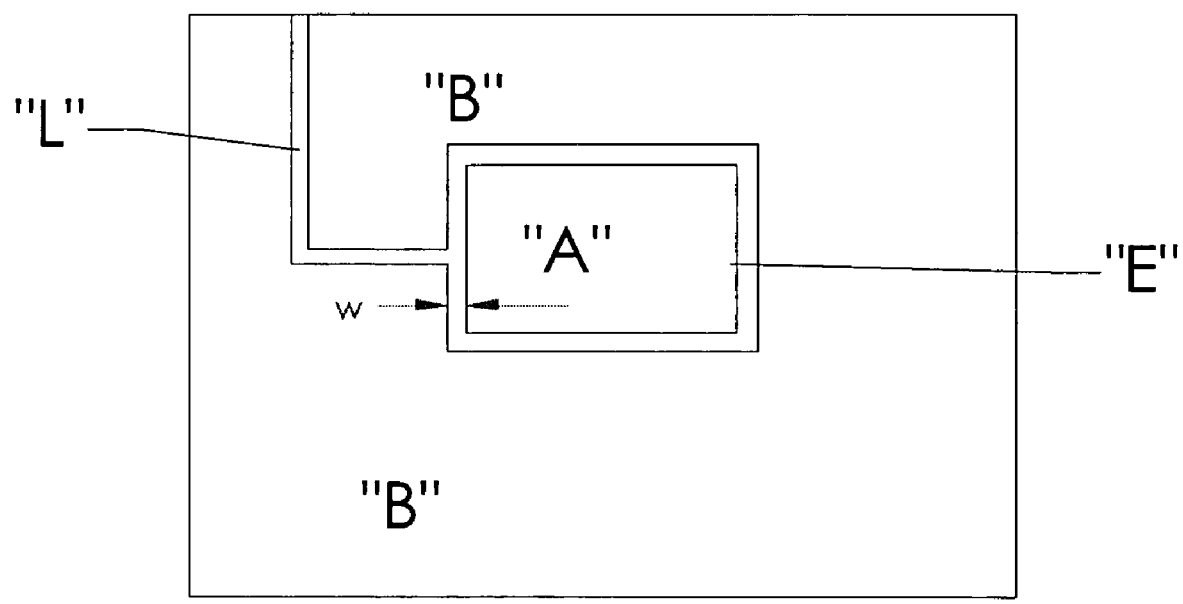
FIG. 1c illustrates the terms "edge patterned area", "non-edge patterned area", "lead line area" and "background area".

For clarity, certain terms used in the present application are illustrated in FIG. 1c. A patterned area is divided into a non-edge patterned area (marked "A") and an edge patterned area (marked "E"). The width ("w") of the edge patterned area ("E") may vary, depending on the size of the pattern and the applications. FIG. 1c also shows a lead line area (marked "L") and the background area (marked "B") on the substrate layer which is not covered by the edge patterned area ("E"), the non-edge patterned area ("A") and the lead line area ("L").

When the singular form of a term such as "an area", "a desired pattern", "a patterned area", "a non-edge patterned area" or "an edge patterned area" is referred to in this application, it is understood that one or more "areas", "desired patterns", "patterned areas", "non-edge patterned areas" or "edge patterned areas" may be present in the steps or processes described.

Step One:

The first step of the process involves formation of a desired pattern and its lead line with a conductive material on a substrate layer.

In order to be distinguished from the conductive layer formed in Step 3, the conductive layer formed or the conductive material used in Step 1 is referred to as the "first" conductive layer (film) or the "first" conductive material, respectively, whereas the conductive layer formed or the conductive material used in Step 3 is referred to as the "second" conductive layer (film) or the "second" conductive material, respectively.

Useful conductive materials for this step may include metal conductive materials such as, aluminum, copper, zinc, tin, molybdenum, nickel, chromium, silver, gold, iron, indium, thallium, titanium, tantalum, tungsten, rhodium, palladium, platinum, cobalt or the like, and metal oxide conductive materials, as well as alloys or multilayer composite films derived from the aforementioned metals and/or metal oxides, e.g., aluminum zinc oxide, gadolinium indium oxide, tin oxide or fluorine-doped indium oxide.

Useful materials for the substrate layer may include epoxy resins, polyimide, polysulfone, polyarylether, polycarbonate (PC), polyethylene terephthalate (PET), polyethylene terenaphthalate (PEN), poly(cyclic olefin) and composites thereof.

The conductive material of a desired pattern and the lead line may be formed on the substrate layer by a variety of methods such as laminating, electroplating, sputtering, vacuum deposition or a combination of more than one process for forming a conductive film onto a substrate layer.

Typically, forming a conductive patterned layer involves the use of a photolithographic process. The process comprises the steps of (i) coating a photoresist on a film of a conductive material; (ii) patterning the photoresist by imagewise exposing it through a photomask to, for example, ultraviolet light; (iii) "developing" the patterned image by removing the photoresist from either the exposed or the unexposed areas, depending on the type of photoresist used, to uncover the conductive material in areas from which it is to be removed (i.e., areas where no pattern or lead line is to be located); (iv) using a chemical etching process to remove the conductive material from the areas from which the photoresist has been removed; and (v) stripping the remaining photoresist to uncover the patterns and/or the lead lines.

Alternatively, the formation of a first conductive film of a desired pattern and its lead line on a substrate layer may be achieved by any of the processes as disclosed in co-pending applications, U.S. Ser. No. 10/422,557 filed Apr. 23, 2003 (corresponding to WO 03/091788, published Nov. 6, 2003) and U.S. Ser. No. 10/666,912 filed on Sep. 19, 2003, the contents of both applications are incorporated herein by reference in their entirety.

Figure 2A:
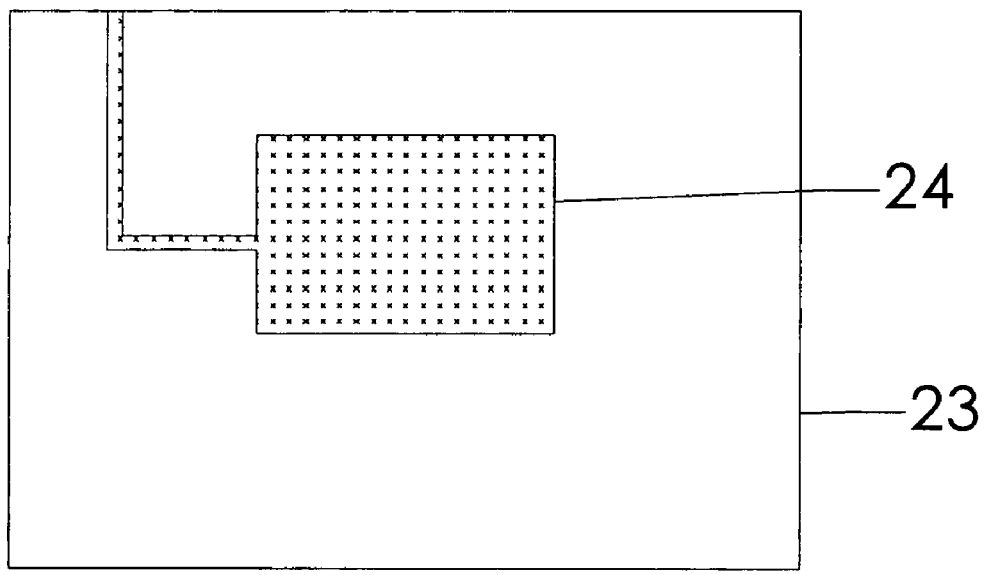
FIGS. 2a-2c illustrate a "positive image printing" process for the formation of a conductive pattern on a substrate layer.
Figure 2B:
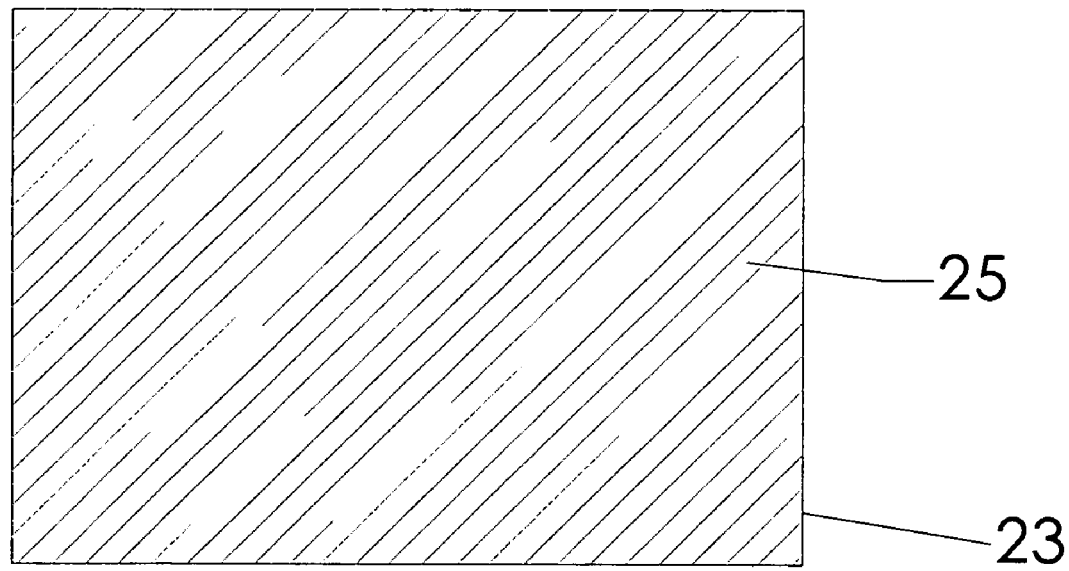
Figure 2C:
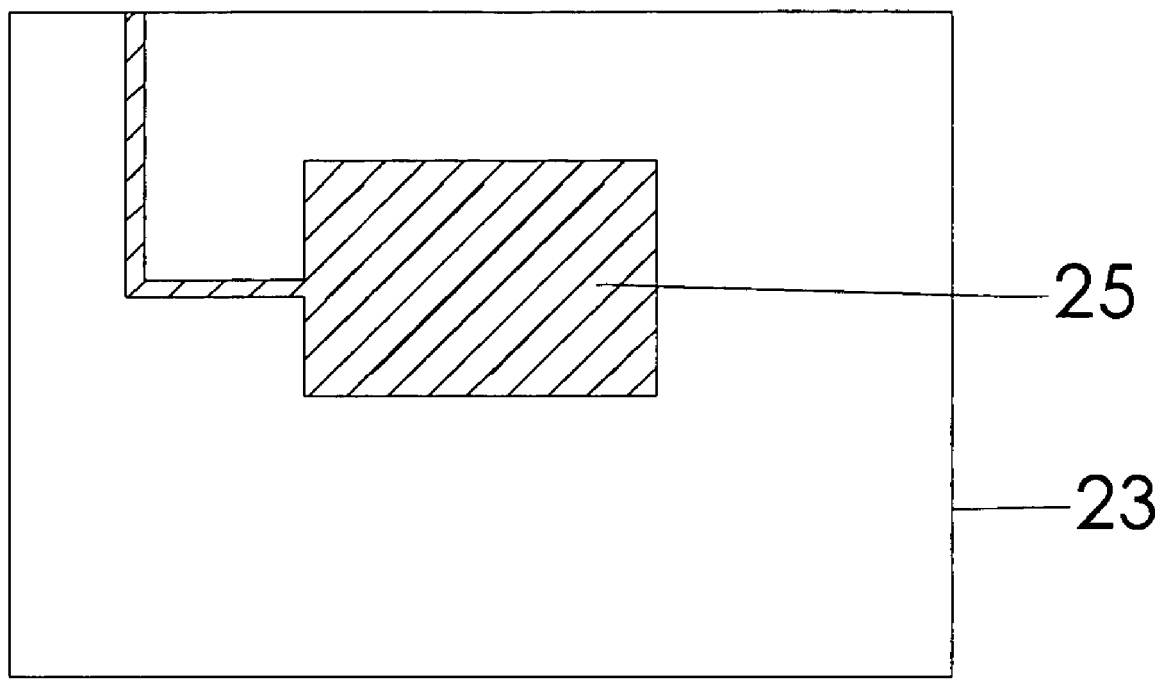

For example, the formation of a first conductive film of a desired pattern and its lead line may be carried out by a "positive image printing" process as illustrated in FIGS. 2a-2c. In this process, a "positive image" is created on a substrate layer (23) as shown in FIG. 2a by printing an area corresponding to a desired pattern and the lead line with a material (24) that is difficult to strip from the substrate layer. Any ink or printable material that has the characteristic that the subsequently deposited conductive film adheres to the ink or printed material more strongly than it adheres to the substrate layer, may be used. In one embodiment, a substrate layer having a poor affinity toward the conductive material may be used. In another embodiment, a surface treatment or primer coating such as a UV curable polymer layer, having good adhesion to both the substrate and the conductive material is used.

The printing may be carried out by any printing techniques, such as flexographic, driographic, electrophotographic or lithographic printing. Other printing techniques, such as stamping, screen printing, gravure printing, ink jet printing or thermal printing may also be suitable.

After formation of the "positive image", a conductive material (25) is deposited on the patterned surface of the substrate layer as shown in FIG. 2b. The deposition of a conductive material may be carried out by any of the methods described below for the "negative image printing" process. However, in the case of the "positive image printing" process, after deposition of the conductive material, the conductive material in the area not covered by the ink or printable material will be removed as shown in FIG. 2c, in a stripping process to reveal the pattern and the lead line.

The stripping may be carried out by using a stripping solvent which may be an aqueous or organic solvent capable of removing the conductive material formed directly on the substrate layer. Alternatively, the stripping may be carried out by mechanical means.

Figure 3A:
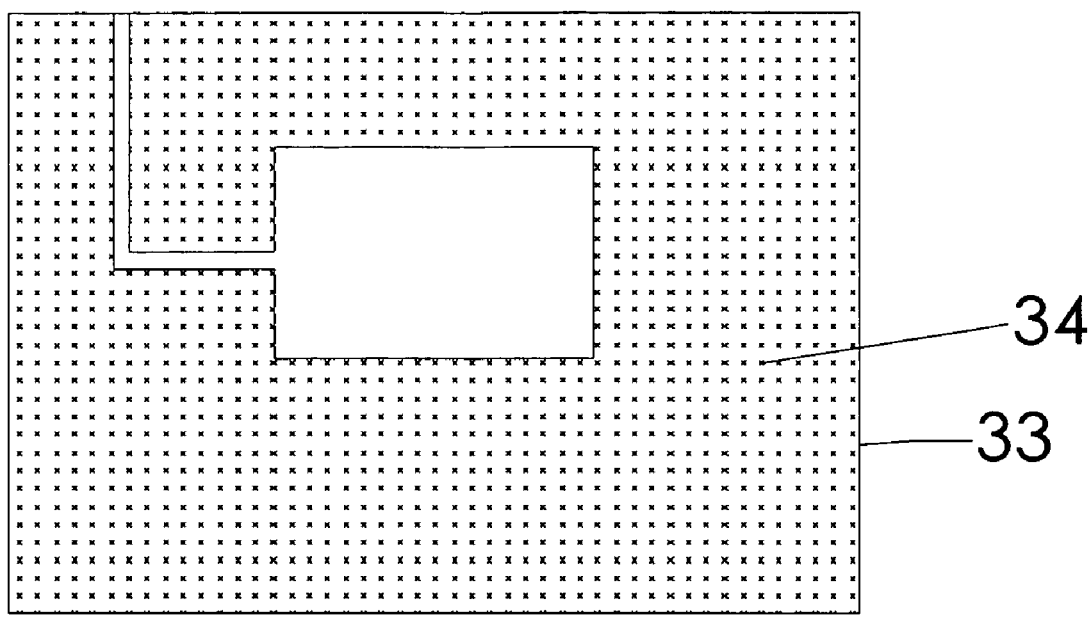
FIGS. 3a-3c illustrate a "negative image printing" process for the formation of a conductive pattern on a substrate layer.
Figure 3B:
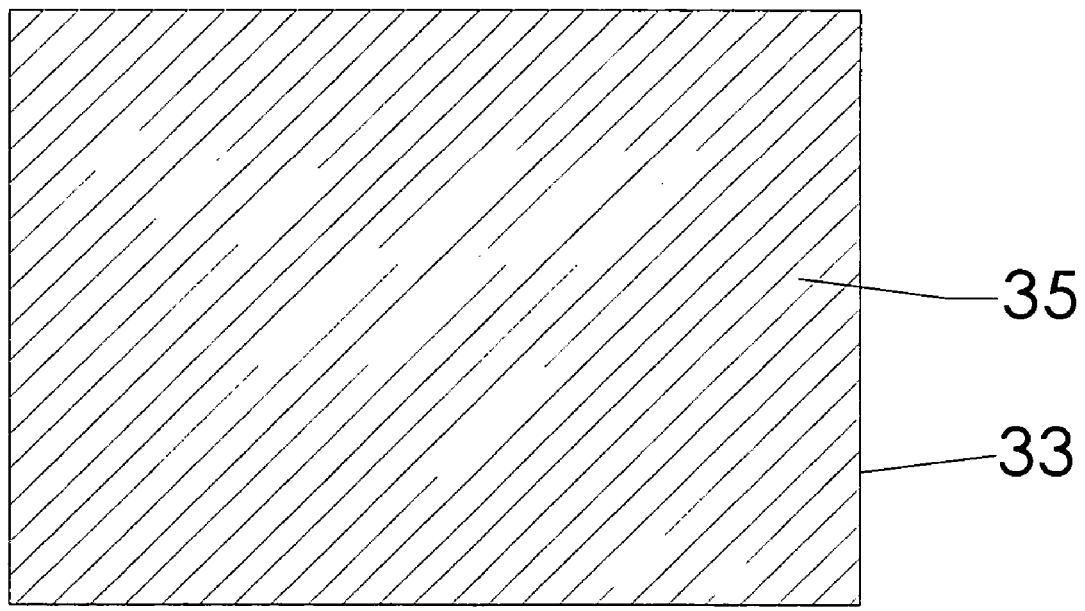
Figure 3C:
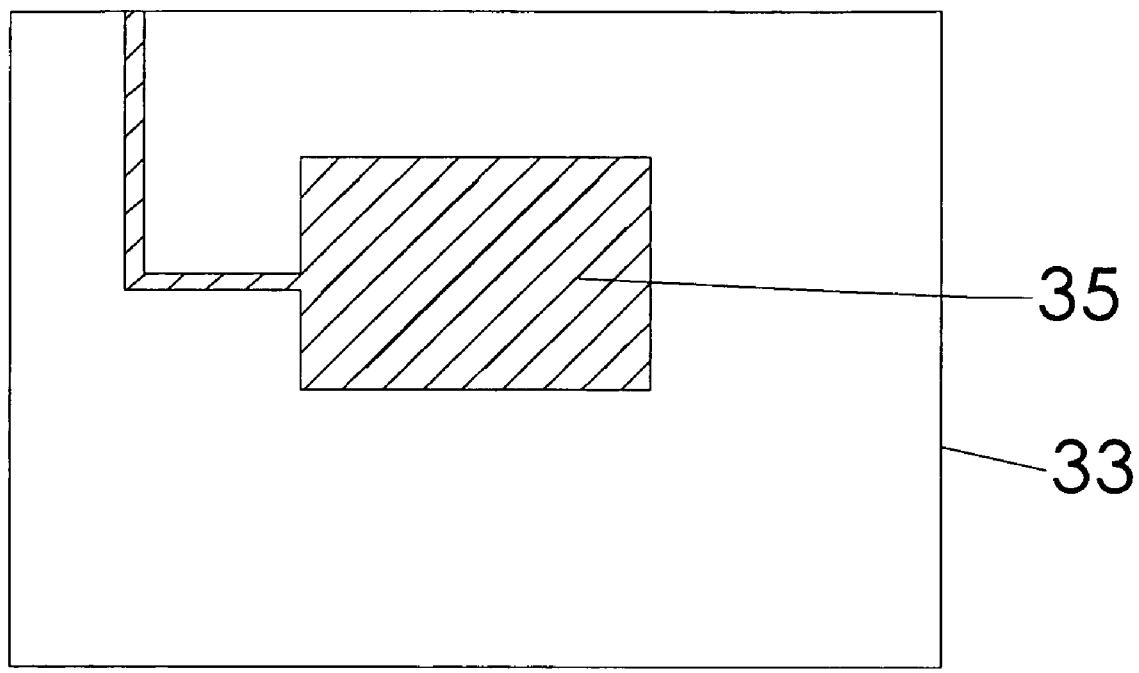

The formation of the first conductive layer of a desired pattern and its lead line may also be carried out by a "negative image printing" process as illustrated in FIGS. 3a-3c. In this process, a masking coating or ink (34) is first printed on a substrate layer (33) to create a "negative image" of the desired pattern and the lead line. In other words, the masking coating or ink is printed in an area where the conductive material will not be present. In essence, the ink pattern serves as a mask for the subsequent deposition of the conductive material.

Any suitable printing techniques, such as flexographic, driographic, electrophotographic or lithographic printing, may be used to print the negative image on the substrate layer. In certain applications, other printing techniques, such as stamping, screen printing, gravure printing, ink jet printing or thermal printing may be suitable, depending on the resolution required.

In one embodiment, the masking coating or ink comprises a re-dispersible particulate. In another embodiment, the masking coating or ink comprises a water-soluble or water-dispersible polymer as a binder. Typical examples of water soluble polymers may include, but are not limited to, polyvinyl alcohol, polyvinylpyrrolidone, polyvinylpyridine, polyacrylic acid, polymethacrylic acid, polyacrylamide, polyethyleneglycol, poly(ethylene-co-maleic anhydride), poly(vinylether-co-maleic anhydride), poly(styrene-co-maleic anhydride), poly(butyelene-co-itaconic acid), PEOX [poly(ethyloxazoline)], polystyrene sulfonate, cellulose derivatives such as hydroxyethyl cellulose, hydroxypropyl cellulose, methyl cellulose, carboxymethyl cellulose, xanthan gum, gum Arabic, gelatin, lecithin or copolymers thereof. The water-dispersible polymer may comprise a water- or alkaline-dispersible wax, polyolefin, or acrylic latexes or dispersions. In one embodiment, the masking coating or ink comprises a solvent-soluble or solvent-dispersible polymer as a binder. In another embodiment, the masking coating or ink comprises a re-dispersible particulate derived from silica, $CaCO_3$, $CaSO_4$, $BaSO_4$, $Al_2O_3$, $TiO_2$, hollow-spheres, non-film-forming latexes or dispersions, inorganic pigment(s) or organic pigment(s). In one embodiment, the masking coating or ink comprises a re-dispersible particulate comprising polymeric or polymeric composite particles. In another embodiment, a re-dispersible particulate is included in the masking coating or ink to facilitate subsequent stripping of the masking coating or ink. In one embodiment, a re-dispersible particulate is included in the masking coating or ink to facilitate subsequent stripping of the masking coating or ink by reducing the thickness or integrity of the masking coating or ink layer and/or improving the permeation of a stripping solvent into the masking coating or ink layer during stripping.

After formation of the "negative image", a conductive material (35) is deposited on the patterned surface of the substrate layer as shown in FIG. 3b. In one embodiment, vapor deposition is used to deposit the conductive material on the patterned side of the substrate layer. In such an embodiment, aluminum, copper or any conductive material suitable for being deposited as a thin film through vapor deposition or spraying may be used as the conductive material. In one alternative embodiment, the conductive material is deposited by sputter coating the patterned side of the substrate layer with the conductive material. In such an embodiment, any conductive material such as gold, silver, copper, iron, nickel, zinc, indium, chromium, aluminum-doped zinc oxide, gadolinium indium oxide, tin oxide, or fluorine-doped indium oxide, or any other conductive material suitable for being deposited in a thin film through sputter coating may be used.

The masking coating or ink is finally stripped from the patterned surface of the substrate layer on which the conductive material has been deposited, as shown in FIG. 3c. The stripping of the coating/ink has the effect of stripping away the printed negative image formed as well as the portion of the conductive material that is deposited onto the area of the substrate layer where the coating/ink was present. As a result, the stripping solvent is able to strip away the coating/ink pattern and the conductive material formed on the top surface of the coating/ink pattern, even though the stripping step is performed after the deposition of the conductive material.

Suitable stripping solvents may include, but are not limited to, water, aqueous solutions, alcohols, ketones, esters, amides, hydrocarbons, alkylbenzenes, pyrrolidones, sulfones, DMSO, or many other common organic solvents or solvent mixtures.

In another alternative embodiment, Step 1 of the process may be carried out by direct printing such as screen printing of a conductive material in the area of a desired pattern and the lead line. In the context of the present invention, the "negative image printing" process or the direct printing process is preferred for Step 1 of the process.

The thickness of the first conductive layer formed in the patterned area and the lead line may vary from nanometers to microns; however it is usually in the range of from about 40 nm to about 5 microns, preferably about 50 nm to about 3 microns.

Step Two:

After the patterned area and lead line are coated with a thin film of a first conductive material, the patterned area (not including the lead line area) is divided into the edge patterned area ("E") and the non-edge patterned area ("A"). The division may be accomplished in two different ways as shown in FIGS. 7a and 7b.

Figure 7A:
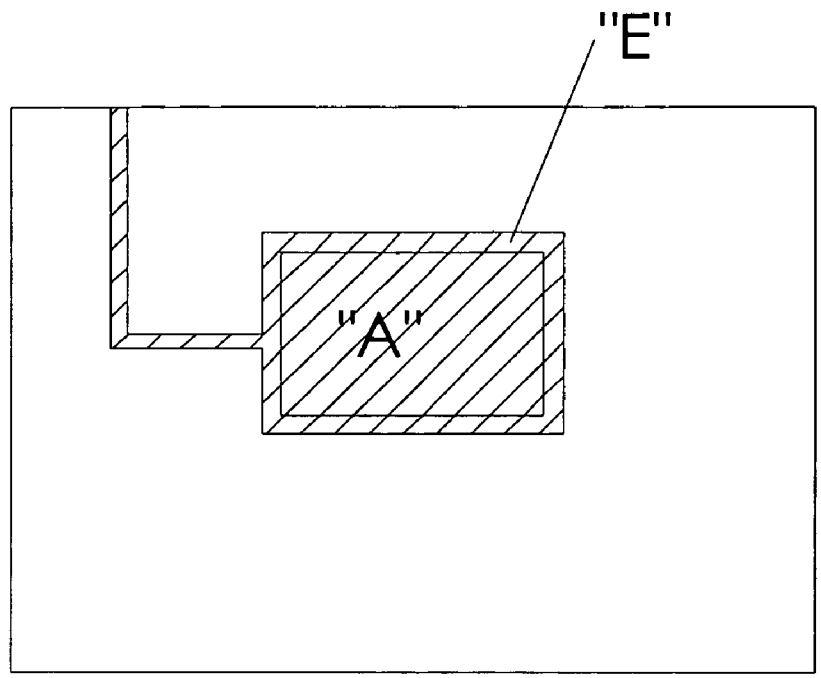
FIGS. 7a and 7b illustrate the creation of an edge patterned area.

In FIG. 7a, the edge patterned area is defined by moving inward. In this case, both the edge patterned area ("E") and the non-edge patterned area ("A") are covered by the first conductive layer.

Figure 7B:
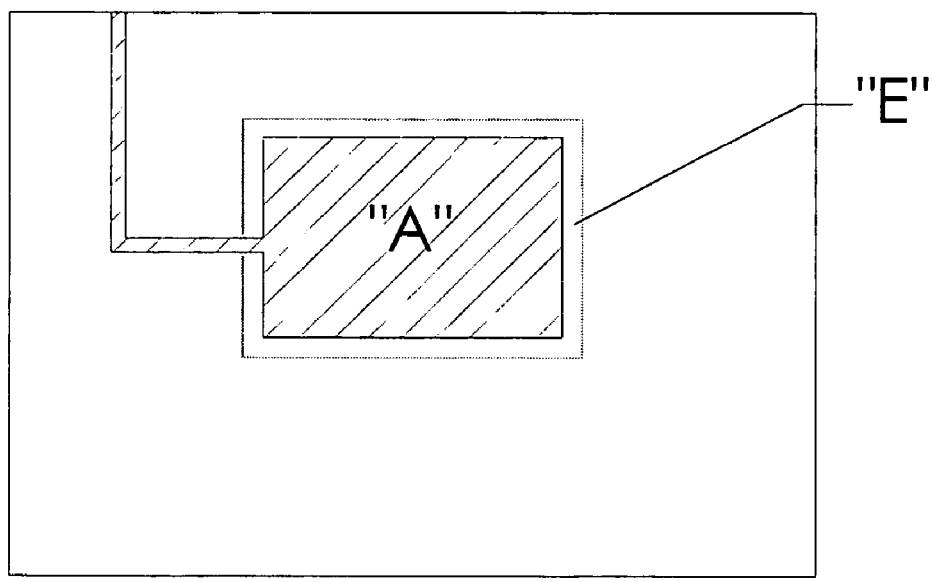

In FIG. 7b, the edge patterned area is defined by moving outward. In this case, most of the edge patterned area ("E") is not covered by the first conductive layer whereas the non-edge patterned area ("A") is covered by the first conductive layer.

In the context of the present invention, the edge patterned area defined by moving inward is more preferred.

Figure 4:
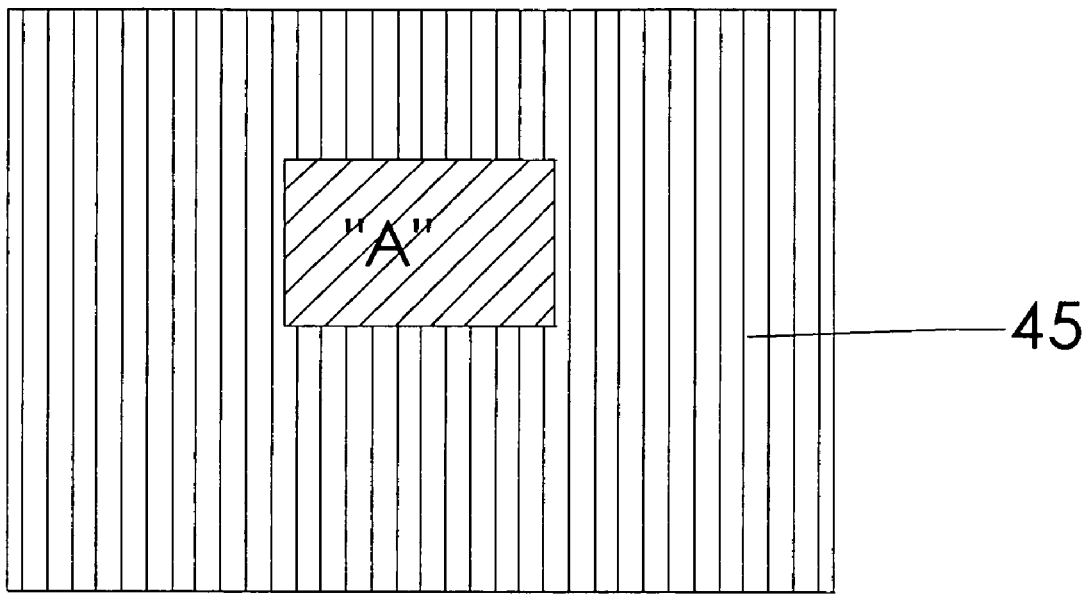
FIG. 4 illustrates the second step of the process involving printing or coating a non-conductive material.

In Step 2, a non-conductive material (45) is coated over the entire area, except the non-edge patterned area (marked "A"). In other words, the non-conductive material is printed or coated over areas "B", "E" and "L", as shown in FIG. 4.

The printing of the non-conductive material may be carried out by a variety of printing methods, such as screen, flexographic or gravure printing. While less preferred, the "negative image printing" or "positive image printing" process described above may also be used for this step. However, for the purpose of the present invention, the screen printing method is the more preferred.

Suitable non-conductive materials may include any of the printable or coating non-conductive materials such as acetates, acrylics, acetal resins, polycarbonates, melamines, neoprene rubbers, polyesters, polyolefins, polystyrenes, polyurethanes, polyvinylchlorides, and thermoplastic materials such as polysulfones, polyetherimides, polyamideimides and polyphenylenes or a plastic material formed from acrylonitrile, butadiene and styrene.

Prior to printing or coating, a non-conductive material is first dissolved or dispersed in a suitable aqueous or organic solvent. The non-conductive material solution or dispersion is then printed or coated in areas "B", "E" and "L", after which the non-conductive material solution or dispersion is dried off and/or hardened (by, for example, evaporation, thermal or radiation cure), leaving a layer of the non-conductive material on the surface of areas "B", "E" and "L".

The thickness of the non-conductive layer may be in the range of microns, for example, about 1 to about 5 microns, preferably about 2 to about 4 microns.

Figure 5:
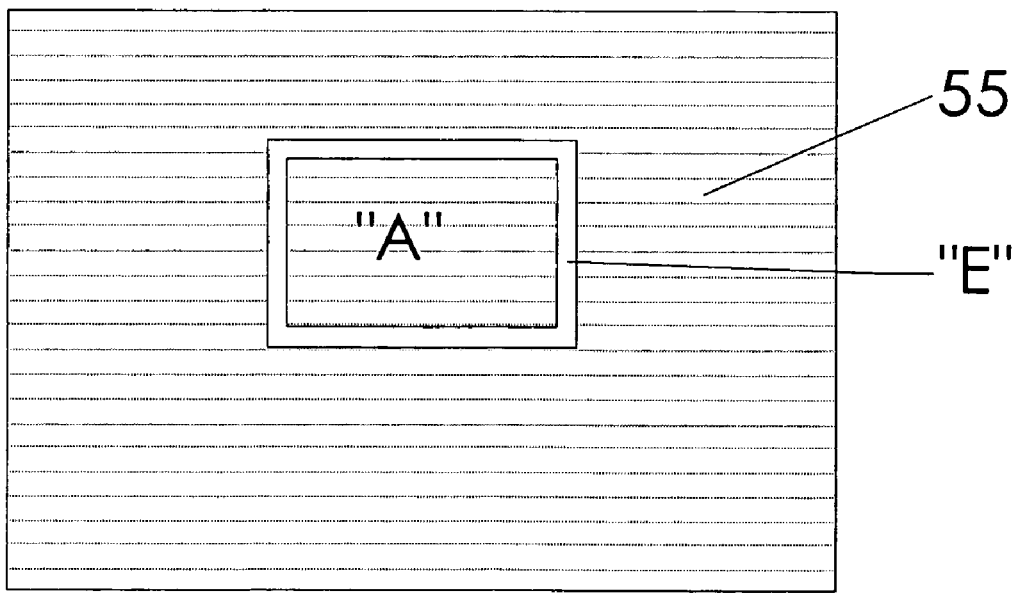
FIG. 5 illustrates the third step of the process involving printing or coating a second conductive material.

Step Three:

After printing of the non-conductive material, a second conductive material (55) is coated over the entire area, except the edge patterned area ("E"). In other words, the second conductive material in Step 3 is printed or coated over areas "A", "B" and "L", as shown in FIG. 5.

The printing of the conductive material may be carried out by a variety of printing methods, such as screen, flexographic or gravure printing, with the screen printing method as the more preferred.

The "negative image printing" or "positive image printing" process described above may be used for this step.

Suitable conductive materials used in this step may be any of those mentioned for Step 1. However, for the purposed of the present invention, a conductive paste such as silver conductive paste or copper conductive paste is more preferred.

The thickness of the second conductive layer may be in the range of microns, for example, from about 1 to about 5 microns, preferably from about 2 to about 4 microns.

The Direct Drive Display of the Present Invention

The direct drive display of the present invention has a multi-layer backplane. FIGS. 6a-6e show the cross-section views of the direct drive display of the present invention, in different areas.

Figure 6A:
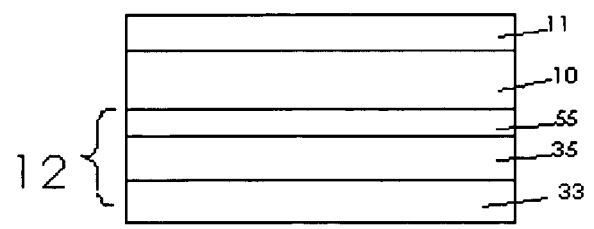
FIGS. 6a-6e are cross-section views of a direct drive display of the present invention, in different areas.

FIG. 6a is the cross-section view of area "A" which is the non-edge patterned area. The display cell layer (10) is sandwiched between a common electrode layer (11) and a backplane (12). The backplane has the substrate layer (33), the first conductive layer (35) and the second conductive layer (55). The migration of the charged pigment particles in the display cell layer, in this area, is caused by the voltage difference between the common electrode layer (11) on one side and the combination of the first conductive layer (35) and the second conductive layer (55) on the other side. The voltage of the combined conductive layer is controlled by the lead line connected to the first conductive layer (35).

Figure 6B:
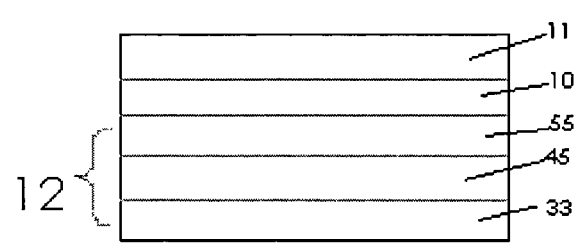

FIG. 6b is the cross-section view of area "B" which is the non-patterned area. The display cell layer (10) is sandwiched between a common electrode layer (11) and a backplane (12) which has a substrate layer (33), the non-conductive layer (45) and the second conductive layer (55). The color of area "B" (i.e., the background color for the display) is generated by the migration of charged pigment particles in the display cell layer which is caused by the voltage difference between the common electrode layer (11) and the second conductive layer (55). A voltage is applied to the second conductive layer (55) through connection to an electrical source. It is noted that the application of a voltage to the second conductive layer in area "B" does not affect the second conductive layer in area "A" because of the presence of the edge patterned area "E" which separates the two areas on the second conductive layer.

Figure 6C:
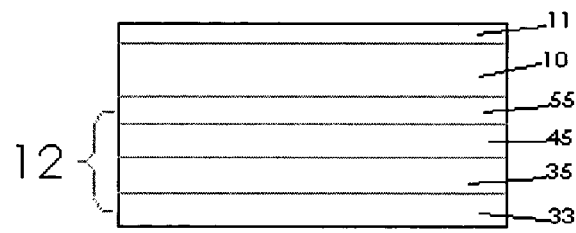

FIG. 6c is the cross-section view of area "L" which is the lead line area. The display cell layer (10) in this area is sandwiched between a common electrode layer (11) and a backplane (12) which as the substrate layer (33), the first conductive layer (35), the non conductive layer (45) and the second conductive layer (55). The color of the lead line is generated by the migration of charged pigment particles caused by the voltage difference between the common electrode layer (11) and the second conductive layer (55). Therefore the color of the lead line would be the same as the background color (the color of area "B") which effectively hides the lead line from the viewer. In addition, because of the increased distance between the common electrode layer (11) and the first conductive layer (35) and the presence of the non-conductive layer (45), the first conductive layer has little, if any, effect on the migration of the charged pigment particles in the display cell layer in this area.

Figure 6D:
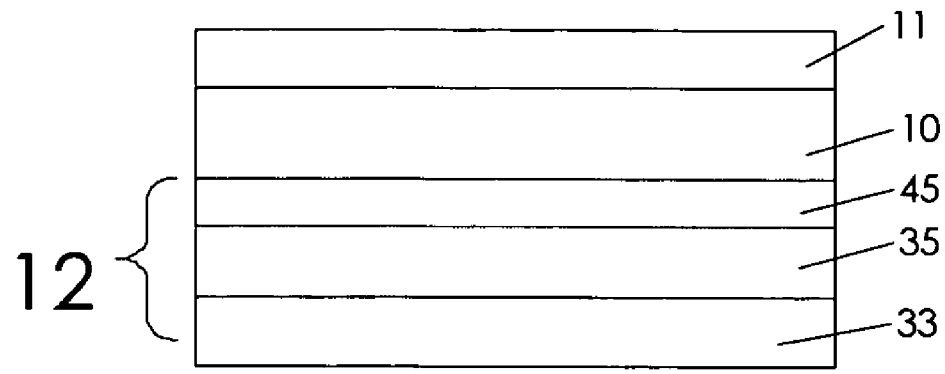

FIG. 6d is the cross-section view of area "E" which is the edge patterned area defined by moving inward. The display cell layer (10) is sandwiched between a common electrode layer (11) and a backplane (12) which has the substrate layer (33), the first conductive layer (35) and the non-conductive layer (45).

Figure 6E:
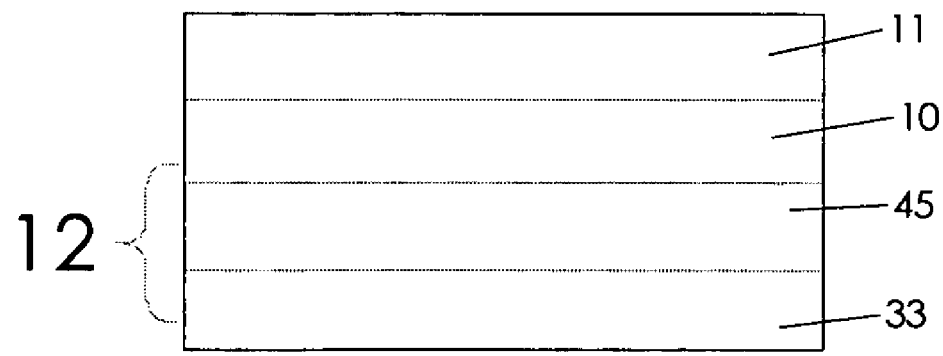

FIG. 6e is the cross-section view of area "E" which is the edge patterned area defined by moving outward. The display cell layer (10) is sandwiched between a common electrode layer (11) and a backplane (12) which has the substrate layer (33) and the non-conductive layer (45).

The charged pigment particles in area "E" are not affected by any voltage difference because of the presence of the non-conductive layer (45).

While the features of the "negative image printing" process, such as the substrate layer (33) and the first conductive layer (35) are referred to in this section, it is understood that Step 1 of the process may be carried out by any of the known patterning processes such as the photolithographic method, the "positive image printing" process or the direct printing method.

The display cell layer may be the partition-type display cells, the microcapsule-type display cells, the TIR-type display cells, as described, for example, in the references referred to above or the microcup-type display cells as described, for example, in U.S. Ser. No. 09/518,488.

The display cell layer may also be an array of display cells which are filled with a liquid crystal composition.

The display cell layer may also be prepared by the Gyricon technology (as disclosed in U.S. Pat. No. 6,588,131 assigned to Gyricon Media, Inc. and U.S. Pat. Nos. 6,497,942, and 5,754,332 assigned to Xerox). A Gyricon sheet is a thin layer of transparent plastic in which millions of small beads, somewhat like toner particles, are randomly dispersed. The beads, each contained in an oil-filled cavity, are free to rotate within those cavities. The beads are "bichromal" with hemispheres of two contrasting colors (e.g., black and white, red and white), and charged so they exhibit an electrical dipole. When a voltage is applied to the surface of the sheet, the beads rotate to present one colored side to the viewer. Voltages can be applied to the surface to create images such as text and pictures. The image will persist until new voltage patterns are applied.

In one embodiment, the display cell layer may be formed on the backplane on the side of the second conductive layer and the common electrode layer is then laminated over the display cell layer, with the conductive side of the common electrode layer facing the display cell layer. The lamination may be carried out with an adhesive layer. In another embodiment, the display cell layer may be formed on the conductive side of the common electrode layer and the backplane is then laminated over the display cell layer, with the second conductive layer facing the display cell layer.

In the context of the present invention, the common electrode layer is formed from a transparent conductive material such as indium tin oxide (ITO) or indium zinc oxide (IZO) and the common electrode layer is the viewing side.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. A process for the manufacture of a backplane for a direct drive display, which process comprises:
    (a) forming a first conductive layer on a substrate layer in a non-edge patterned area, an edge patterned area surrounding the non-edge patterned area and a lead line area;
    (b) printing or coating a non-conductive layer in the edge patterned area, the lead line area and the background area, but not in the non-edge patterned area; and
    (c) printing or coating a second conductive layer in the non-edge patterned area, the lead line area and the background area, but not in the edge patterned area.

2. The process of claim 1 wherein step (a) is carried out by a photolithographic method.

3. The process of claim 1 wherein step (a) is carried out by a positive image printing method which comprises printing the non-edge patterned area, the edge patterned area and the lead line area with an ink or printable material, covering the substrate layer with a conductive material and removing the conductive material which is not in the non-edge patterned area, the edge patterned area and the lead line area.

4. The process of claim 1 wherein step (a) is carried out by a negative image printing method which comprises printing an area which is not in the non-edge patterned area, the edge patterned area and the lead line area with an ink or printable material, covering the substrate layer with a conductive material and removing the ink or printing material and the conductive material which are not in the non-edge patterned area, the edge patterned area and the lead line area.

5. The process of claim 1 wherein step (a) is carried out by a direct printing method.

6. The process of claim 1 wherein the first conductive layer is formed from a metal conductive material.

7. The process of claim 6 wherein the metal conductive material is aluminum, copper, zinc, tin, molybdenum, nickel, chromium, silver, gold, iron, indium, thallium, titanium, tantalum, tungsten, rhodium, palladium, platinum or cobalt.

8. The process of claim 6 wherein the metal conductive material is aluminum or copper.

9. The process of claim 1 wherein the first conductive layer is formed from a metal oxide conductive material.

10. The process of claim 1 wherein the first conductive layer is formed by sputtering, vapor deposition or spraying.

11. The process of claim 1 wherein step (b) is carried out by screen, flexographic or gravure printing.

12. The process of claim 1 wherein step (b) is carried out by screen printing.

13. The process of claim 1 wherein the non-conductive material is selected from the group consisting of acetates, acrylics, acetal resins, polycarbonates, melamines, neoprene rubbers, polyesters, polyolefins, polystyrenes, polyurethanes, polyvinylchlorides, and thermoplastic materials such as polysulfones, polyetherimides, polyamideimides and polyphenylenes and a plastic material formed from acrylonitrile, butadiene and styrene.

14. The process of claim 1 wherein step (c) is carried out by screen, flexographic or gravure printing.

15. The process of claim 1 wherein step (c) is carried out by screen printing.

16. The process of claim 1 wherein the second conductive layer is formed from a conductive paste.

17. The process of claim 16 wherein the conductive paste is silver or copper conductive paste.

18. A process for the manufacture of a direct drive display, which process comprises:
    (a) forming the backplane according to the process of claim 1,
    (b) forming a display cell layer on the multi-layer backplane, and
    (c) laminating a common electrode layer over the display cell layer.

19. A process for the manufacture of a direct drive display, which process comprises:
    (a) forming a display cell layer over a common electrode layer,
    (b) forming the backplane according to the process of claim 1, and
    (c) laminating the multi-layer backplane over the display cell layer.

20. A process for the manufacture of a backplane for a direct drive display, which process comprises:
    (a) forming a first conductive layer on a substrate layer in a non-edge patterned area and a lead line area;
    (b) printing or coating a non-conductive layer in an edge patterned area surrounding the non-edge patterned area, the lead line area and the background area, but not in the non-edge patterned area; and
    (c) printing or coating a second conductive layer in the non-edge patterned area, the lead line area and the background area, but not in the edge patterned area.

21. The process of claim 20 wherein step (a) is carried out by a photolithographic method.

22. The process of claim 20 wherein step (a) is carried out by a positive image printing method which comprises printing the non-edge patterned area and the lead line area with an ink or printable material, covering the substrate layer with a conductive material and removing the conductive material which is not in the non-edge patterned area and the lead line area.

23. The process of claim 20 wherein step (a) is carried out by a negative image printing method which comprises printing an area which is not in the non-edge patterned area and the lead line area with an ink or printable material, covering the substrate layer with a conductive material and removing the ink or printing material and the conductive material which are not in the non-edge patterned area and the lead line area.

24. The process of claim 20 wherein step (a) is carried out by a direct printing method.

25. The process of claim 20 wherein the first conductive layer is formed from a metal conductive material.

26. The process of claim 25 wherein the metal conductive material is aluminum, copper, zinc, tin, molybdenum, nickel, chromium, silver, gold, iron, indium, thallium, titanium, tantalum, tungsten, rhodium, palladium, platinum or cobalt.

27. The process of claim 25 wherein the metal conductive material is aluminum or copper.

28. The process of claim 20 wherein the first conductive layer is formed from a metal oxide conductive material.

29. The process of claim 20 wherein the first conductive layer is formed by sputtering, vapor deposition or spraying.

30. The process of claim 20 wherein step (b) is carried out by screen, flexographic or gravure printing.

31. The process of claim 20 wherein step (b) is carried out by screen printing.

32. The process of claim 20 wherein the non-conductive material is selected from the group consisting of acetates, acrylics, acetal resins, polycarbonates, melamines, neoprene rubbers, polyesters, polyolefins, polystyrenes, polyurethanes, polyvinylchlorides, and thermoplastic materials such as polysulfones, polyetherimides, polyamideimides and polyphenylenes and a plastic material formed from acrylonitrile, butadiene and styrene.

33. The process of claim 20 wherein step (c) is carried out by screen, flexographic or gravure printing.

34. The process of claim 20 wherein step (c) is carried out by screen printing.

35. The process of claim 20 wherein the second conductive layer is formed from a conductive paste.

36. The process of claim 35 wherein the conductive paste is silver or copper conductive paste.

37. A process for the manufacture of a direct drive display, which process comprises:
  (a) forming the backplane according to the process of claim 20,
  (b) forming a display cell layer on the multi-layer backplane, and
  (c) laminating a common electrode layer over the display cell layer.

38. A process for the manufacture of a direct drive display, which process comprises:
  (a) forming a display cell layer over a common electrode layer,
  (b) forming the backplane according to the process of claim 20, and
  (c) laminating the multi-layer backplane over the display cell layer.

* * * * *